United States Patent [19]
Hoshi et al.

[11] Patent Number: 4,881,614
[45] Date of Patent: Nov. 21, 1989

[54] MOTORCYCLE

[75] Inventors: Norio Hoshi; Tetsuro Yamaguchi, both of Saitama; Yasuhiro Okada, Tokyo; Takao Matsukawa, Saitama, all of Japan

[73] Assignee: Honda Giken Kogyo Kabushiki Kaisha, Tokyo, Japan

[21] Appl. No.: 156,021

[22] Filed: Feb. 16, 1988

[30] Foreign Application Priority Data

Feb. 16, 1987 [JP] Japan ................... 62-31511
Feb. 17, 1987 [JP] Japan ............. 62-20744[U]
Feb. 17, 1987 [JP] Japan ............. 62-20745[U]

[51] Int. Cl.$^4$ .................. B62D 61/02; B62M 7/06
[52] U.S. Cl. .................... 180/225; 180/309; 180/229
[58] Field of Search ............... 180/225, 309, 219, 296, 180/89.2, 229

[56] References Cited

U.S. PATENT DOCUMENTS 4,484,651 11/1984 Hattori et al. ................ 180/225
4,611,679 9/1986 Yanagishita et al. .......... 180/68.3
4,637,486 1/1987 Iwai .............................. 180/225
4,648,474 3/1987 Shinozaki et al. ............. 180/219

FOREIGN PATENT DOCUMENTS

1091580 10/1954 France ......................... 180/225
58-89423 5/1983 Japan .......................... 180/89.2
59-103918 6/1984 Japan .......................... 180/309
60-163725 8/1985 Japan .
61-163074 7/1986 Japan .
61-39083 11/1986 Japan .

Primary Examiner—Charles A. Marmor
Assistant Examiner—Tamara L. Finlay
Attorney, Agent, or Firm—Birch, Stewart, Kolasch & Birch

[57] ABSTRACT

A motorcycle exhaust pipe arrangement includes a frame having a head pipe, a main pipe, a down tube, at least one under pipe and a pair of center pipes. A fuel tank is operatively connected to the main pipe. An engine is mounted on the at least one under pipe and is disposed beneath the fuel tank. A seat is mounted adjacent said fuel tank and is disposed above the engine. A rear shock absorber is operatively mounted between the seat and the at least one under pipe for absorbing shock supplied to the seat. The rear shock absorber is centrally disposed relative to a longitudinal axis of the motorcycle. An exhaust pipe is connected to the engine and extends rearwardly therefrom, the exhaust pipe is disposed substantially at a midpoint of the rear shock absorber and extends substantially horizontally therefrom in the longitudinal direction of the motorcycle for lowering the center of gravity of the motorcycle and providing a symmetrical rigid frame for supporting the engine, fuel tank and seat.

8 Claims, 6 Drawing Sheets

PRIOR ART

FIG. 1

PRIOR ART

MOTORCYCLE

BACKGROUND OF THE INVENTION

1. Field of the Invention

The present invention relates to a motorcycle and more particularly to an arrangement of the air/gas mixture intake device and exhaust pipe. In addition, the present invention relates to the arrangement of an exhaust pipe for a motorcycle having a heat exchanger, such as a radiator, mounted on the front of the motorcycle.

2. Description of Background Art

In a motorcycle, an exhaust pipe extends from an engine rearwardly along a vehicle body. Generally, in the case of a two stroke cycle engine, in order to enhance a scavenging efficiency by utilizing an inertia effect of an exhaust gas within the exhaust pipe, the exhaust pipe increases its volume gradually from its inlet of the exhaust gas and after reaching a maximum diameter, decreases its volume gradually so as to become a considerably slender form at the outlet thereof.

Figure 1:
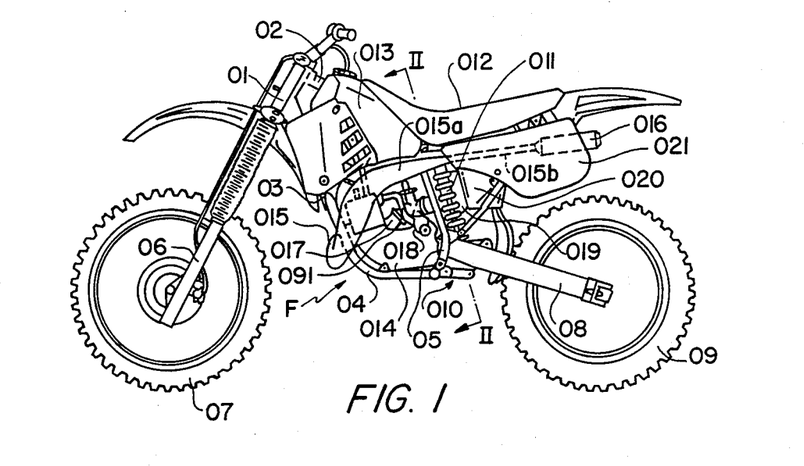
FIG. 1 is a side view of a conventional motor cycle.
Figure 2:
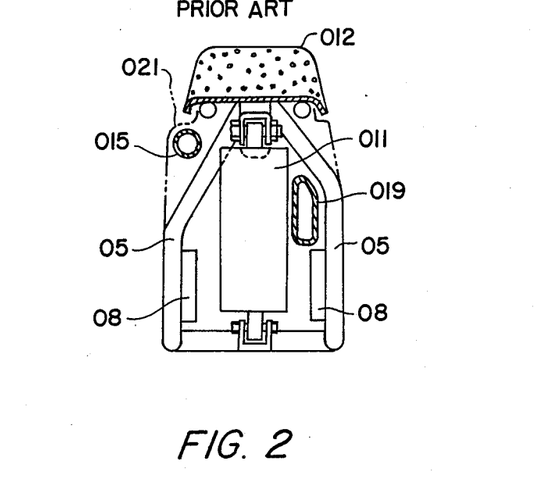
FIG. 2 is a rough sectional view taken along line II—II in FIG. 1.

FIGS. 1 and 2 are a side view and a cross-sectional view, respectively, of a conventional off the road motorcycle. A vehicle body frame F comprises a head pipe 01 at the front portion thereof, a main pipe 02 extending rearwardly of the upper portion of the head pipe 01, a down tube 03 extending obliquely downwardly and rearwardly of the lower portion of the head pipe 01, a pair of right and left under pipes 04 which are connected to the down tube 03 and extend rearwardly at the lower portion of the vehicle body, and a pair of right and left center pipes 05 adapted to connect each end of the under pipes 04 with the rear end of the main pipe 02.

A front wheel 07 is supported on the vehicle body frame F through the intermediary of a front fork 06 which is rotatably mounted relative to the head pipe 01. A rear wheel 09 is carried on the rear end of a rear fork 08 which is pivoted at the rearward lower portion of the vehicle body frame F. A rear cushion 011 is provided at the center of the width of the vehicle body. A seat 012 is mounted above the cushion. A fuel tank 013 is mounted in front of the seat 012 straddling the main pipe 02. A two stroke cycle engine 014 is mounted in front of the rear cushion 011 and under the fuel tank 013. A exhaust pipe 015 of the engine 014 extends forwardly of the engine cylinder, curves downwardly laterally, ascends upwardly along the left lateral side of the vehicle body, and then extends further rearwardly along the left lower edge of the seat 012. The forward portion of the exhaust pipe 015 is an expansion chamber 015a of a larger diameter. The rearward portion thereof is tapered to form a smaller diameter portion 015b and is connected with a silencer 016. Longitudinally extending on the right side of the engine 014 and the rear cushion 011 is an air/gas mixture intake device which includes a suction pipe 017, a carburetor 018, a connecting pipe 019 and an air cleaner 020. In addition, a kick pedal 091 is provided for starting the engine.

Figure 5:
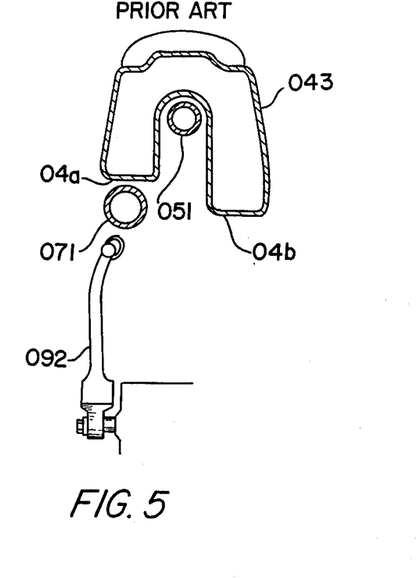
FIG. 5 is a sectional view of a conventional motorcycle.

FIG. 5 illustrates another cross-sectional view of a conventional motorcycle wherein the fuel tank 043 includes a right portion 04b and a left portion 04a. The left portion 04a is smaller in size relative to the right portion 04b to permit the exhaust pipe 071 to be disposed adjacent to the left portion 04a. A kick pedal 092 is provided for starting the engine.

Figure 6:
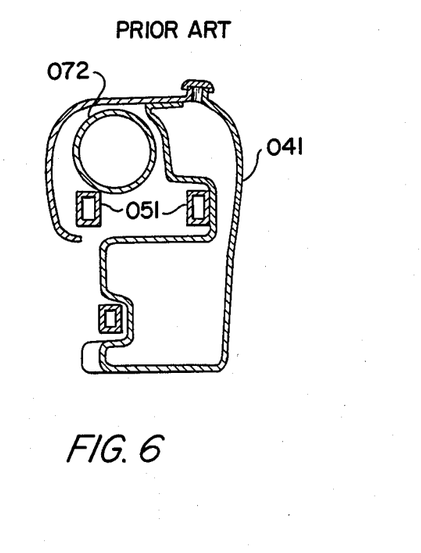
FIGS. 6 and 7 are sectional views similar to FIG. 5, each showing a conventional arrangement of the fuel tank.
Figure 7:
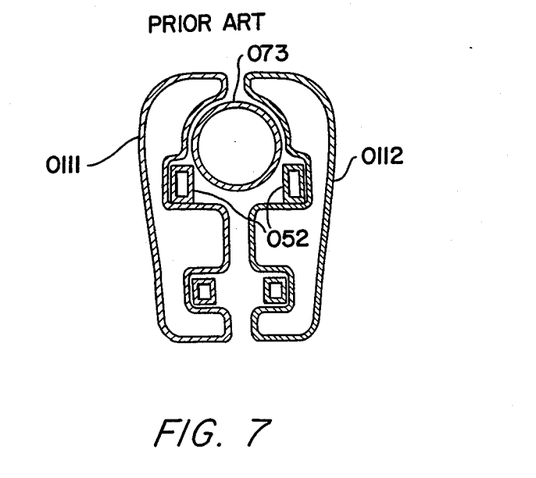

In Japanese provisional patent Publication No. 61-163074, a motorcycle is disclosed in which an exhaust pipe is positioned along a main frame at the same level as a fuel tank. As illustrated in FIG. 6, in this motorcycle, a fuel tank 041 is provided only on one side of a main frame 051. An exhaust pipe 072 is provided on the other side displaced from the fuel tank 041. In another example, as illustrated in FIG. 7, the fuel tank 042 is divided into a pair of right and left tanks 0111, 0112. Each tank 0111, 0112 is mounted on the vehicle body from the respective lateral sides. An exhaust pipe 073 is disposed adjacent to the central portion of the gas tanks. A main frame 052 is positioned within the gas tanks 0111, 0112.

In the above-referred motorcycle, as the right and left center pipes 05, 05 are gathered at a higher level and are connected to the rear end of the main pipe 02, the width (span) between the center pipes 05, 05 becomes narrower gradually in proportion as the center pipes 05, 05 project upwardly. Therefore, through the intake device (the connecting tube 019) located at a comparatively low position is able to be arranged inside the center pipes 05, the exhaust pipe 015 located at a high position must be arranged outside the center pipe 05. In order to prevent the exhaust pipe 015 from projecting from the lateral side of the vehicle body, the center pipe 05 at the left side is formed in the upper portion thereof to deviate more inwardly than the upper portion of the right side center pipe 05. Accordingly, an unbalanced arrangement will be developed in the vehicle body frame. Thus, to improve the unbalanced arrangement in strength and rigidity, it is necessary to increase the weight of the vehicle body frame.

Further, even if the right and left center pipe 05, 05 are formed unsymmetrical, the exhaust pipe 015 will project laterally outwardly. Thus, the riding comfort of the driver will suffer therefrom until the width of the seat 012 is expanded or the side cover 021 which covers the exhaust pipe 015 is expanded to project laterally outwardly. Generally, with respect to a riding posture of the driver, such a riding posture wherein the legs are freely stretched from the narrower seat position to the wider step position is better.

With respect to FIG. 5, the bottom of the left portion 04a of the fuel tank must be positioned relatively high. Thus, a volume of the fuel tank will be reduced and the weight of the fuel tank will be unbalanced. This result also occurs with respect to FIG. 6. In FIG. 7, the unbalanced in weight of the fuel tank may be avoided. However, there is an increase in component elements and time for manufacturing because two fuel tanks are required to be mounted on the motorcycle.

With respect to a third embodiment of the present invention, a motorcycle includes a water-cooled engine having a radiator mounted at the front side of the vehicle body. Air passes over the radiator to thereby cool the radiator. In addition, motorcycles are known which include an oil cooler or the like as a heat exchanger which is provided in the front portion of the vehicle body.

On the other hand, in a two stroke cycle engine, the inside of an exhaust pipe is maintained at a negative pressure during a scavenging operation. This is caused by the inertia effect of the exhaust gas therein in order to expel the exhaust gas and thus to improve scavenging efficiency. In another aspect, by utilizing a reflection wave, a positive pressure is created at the position of an exhaust port just before the exhaust port is closed to press back fresh air which is about to blow through. Therefore, one form of exhaust pipe increases its volume gradually from an inlet of the exhaust gas, becomes a maximum volume and thereafter decreases its volume gradually so as to be considerably tapered at an outlet thereof. Further, for obtaining a necessary length for the above operation, the exhaust pipe is curved in a large curvature from the inlet of the exhaust gas communicating with the exhaust port of the engine, extends downwardly, then laterally of the vehicle body and turns upwardly thereby extending along the bottom of the fuel tank above the engine or extending rearwardly substantially at the same level as the fuel tank.

SUMMARY OF THE INVENTION

The present invention is generally constructed under the above described conditions. According to the present invention, a motorcycle includes a rear shock absorber under a seat which is centrally disposed in the lateral direction of a vehicle body. An engine is mounted in front of the shock absorber. An air/gas mixture intake device and an exhaust pipe for the engine are arranged, respectively at both sides of the rear shock absorber and extend substantially horizontally in the longitudinal direction of the motorcycle and at substantially a middle level position of the rear shock absorber.

In the present invention, the exhaust pipe is arranged at a comparatively lower position in symmetry with the mixture intake device at the opposite side thereof. In this manner, the exhaust pipe may be extended inside the center pipe at the lower wider position between the center pipes. Therefore, the vehicle body frame may be formed symmetrical in strength and rigidity at the opposite sides thereof.

In addition, the present invention is intended to overcome the disadvantages of the prior art device as mentioned above with respect to FIGS. 5-7. Therefore, in the present invention wherein a motorcycle is provided having an engine disposed under a fuel tank and a kick operating starter device is provided at a side of the engine, an exhaust pipe for the engine is arranged passing inside an arm portion of the kick operating starter device which is adapted to be connected to a pedal portion with a pivot portion.

According to the present invention, as the exhaust pipe is disposed at a lower level inside the arm portion of the kick operating starter device (kick pedal), the bottom of the fuel tank which is positioned at the same side of the exhaust pipe may be extended up to the same level as the bottom of the opposite side. Accordingly, there may be mounted a fuel tank which is large in volume and balanced in weight. To arrange the exhaust pipe at a lower position may contribute to lowering the center of gravity of the vehicle body. Further, generally in the motorcycle, the width of the fuel tank is formed narrower than the width of each step in order to allow the driver to straddle the seat for a good riding condition, the exhaust pipe does not protrude outwardly of a line connecting between the step and the fuel tank at the lateral side of the vehicle body so as to ensure the aforementioned comfortable riding condition. Furthermore, the exhaust pipe may be protected by the kick operating starter device since it is arranged inside of the starter device.

In the third embodiment of the present invention, problems relating to a conventional motorcycle wherein cooling air is prevented from passing through the radiator because the exhaust pipe is comparatively large in diameter and extends obliquely rearwardly from bottom to top are overcome.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 3:
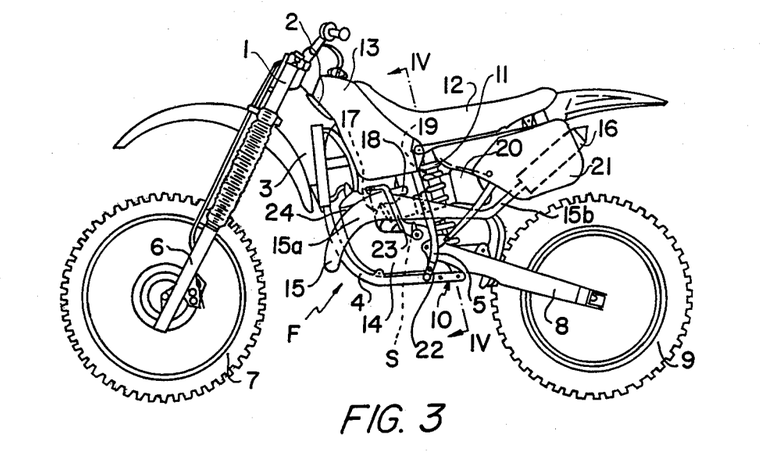
FIG. 3 is a side view of a motorcycle according to the present invention.

FIG. 3 is a side view of a motorcycle in accordance with the present invention. The basic construction of the motorcycle is similar to the motorcycle illustrated in FIG. 1. Namely, a vehicle body frame F comprises a head pipe 1, a main pipe 2, a down tube 3, a pair of under pipes 4 and a pair of center pipes 5. A front wheel 7 is carried through the intermediary of a front fork 6 which is rotatably mounted within the head pipe 1. A rear wheel 9 is carried on the rear end of a rear fork 8 which is swingably pivoted on the rearward lower position of the vehicle body frame F. At the forward portion of the rear fork 8, the lower end of a rear shock absorber 11 is connected through the intermediary of a link mechanism 10. The upper end of the rear shock absorber 11 is connected to the vehicle body frame F at the juncture between the main pipe 2 and the center pipes 5. The rear shock absorber 11 is the only member which is arranged at the laterally central position of the vehicle body. The function of the shock absorber is to allow movement of a rear wheel lever arm while absorbing shock which would be transmitted to the frame of the motorcycle. A seat 12 is disposed above the shock absorber 11. Forwardly of the seat 12, a fuel tank 13 is mounted in a straddling condition over the main pipe 2. A two stroke cycle engine 14 is mounted under the fuel tank. 13 and in front of the rear shock absorber 11. A pair of steps 22 are provided at the lower ends of the right and left center pipes 5, respectively. A driver straddling the seat 12 may rest his/her legs on the steps 22. A kick pedal 23 is provided for starting the engine.

Figure 4:
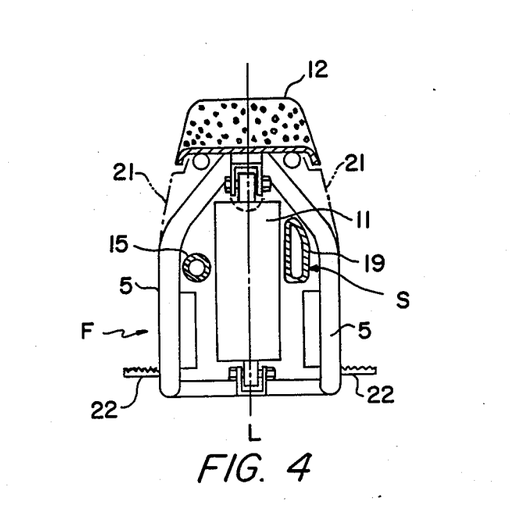
FIG. 4 is a rough sectional view taken along line IV—IV in FIG. 3.

An exhaust pipe 15 projects forwardly of the cylinder 24 of the engine 14, turns downwardly and leftwardly, ascends slightly upwardly, passes along the left side of the cylinder 24 and inside the kick pedal 23 and the center pipe 5 and extends rearwardly at the left side of the rear shock absorber 11 and substantially horizontally at the middle level of the shock absorber. An expansion chamber 15a of larger diameter is positioned forward of the exhaust pipe 15. The rearward portion is tapered to form a small diameter portion 15b which is connected at its rear end to a silencer 16. The silencer 16 is arranged in an upwardly slanted condition and is open at a rear end adjacent the upper rear position of the vehicle body. An air/gas mixture intake device S comprises a suction pipe 17, a carburetor 18, a connecting tube 19 and an air cleaner, and extends rearwardly of the cylinder 24. The intake device S passes through the inside of the right side center pipe 5 and at the right side of the rear shock absorber 11 and extends substantially at the same level as the exhaust pipe 15. As illustrated in FIG. 4, the exhaust pipe 15 and the intake device S are arranged substantially symmetrical at the right and left sides of the rear shock absorber 11. A pair of side covers 21 are fitted at both sides under the seat 12 to cover the rearward portions of the exhaust pipe 15 and the intake device S at the opposite sides thereof.

By such an arrangement of the exhaust pipe 15 and the intake device S as described above, the pair of right and left center pipes 5, 5 may be constituted symmetrical with aspect to the vehicular center line L whereby the vehicle body frame F may be symmetrically formed to be balanced in strength and rigidity along the right and left, simple in construction and comparatively light in weight. Further, the vehicle body frame adjacent to the seat 12 is formed narrower in width and the span between the pair of side covers 21, 21 becomes smaller and symmetrical. Accordingly, a driver straddling the seat 12 may maintain a good riding posture in such a natural condition that he/she stretches his/her legs downwards, while opening them slightly in each lateral direction by placing his/her feet on the steps 22. Furthermore, because the exhaust pipe 15 is positioned lower than the conventional exhaust pipe, the center of gravity of the vehicle may be lowered and the control of the vehicle is simplified.

As explained heretofore, according to the present invention, the motorcycle has a rear shock absorber under the seat and at a laterally central location of the vehicle body. The engine, is mounted in front of the shock absorber. The intake device: and the exhaust pipe for the engine are arranged at each side of the rear shock absorber and extend substantially horizontal in the longitudinal direction of the vehicle body and are positioned, at substantially the middle portion of the rear shock absorber. Therefore, the vehicle body frame may be formed in a symmetrical configuration which is balanced in lateral strength and rigidity thereby making the construction simple and lightweight. Also, the seat area is formed narrower and symmetrical so as to obtain a good riding condition for the driver and to obtain a lower center of gravity of the vehicle body.

Figure 8:
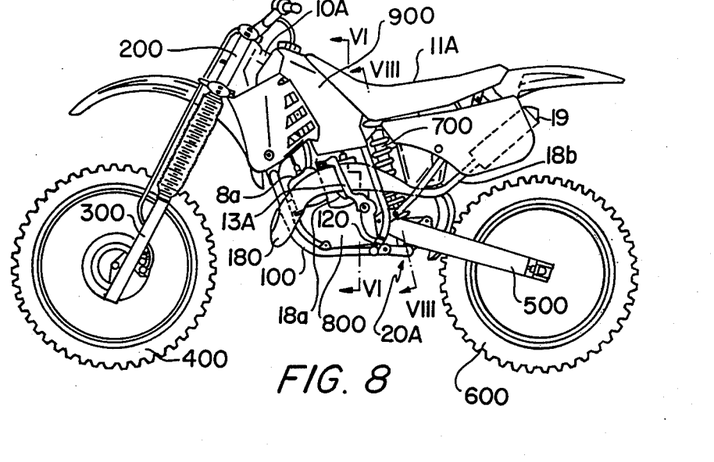
FIG. 8 is a side view of a motorcycle having a frame and fuel tank arrangement according to another embodiment of the present invention.

The present invention will be explained hereunder in accordance with a second embodiment of the invention. FIG. 8 is a side view showing the entire off the road motorcycle to which the present invention is applied. At the forward portion of a vehicle body frame 100, a front wheel 400 is carried by a front fork 300 which is rotatably mounted relative to a head pipe 200. A rear fork 500 is pivotably supported upwardly and downwardly on the rearward lower portion of the vehicle body frame 100 and extends rearwardly therefrom. A rear wheel 600 is mounted at the rear end of the rear fork. A rear shock absorber 700 is provided between the rear fork 500 and the upper body frame construction through the intermediary of a link 20A. An engine 800 is mounted on, the vehicle body frame 100 forwardly of the shock absorber. The engine 800 is a two stroke cycle engine.

Figure 9:
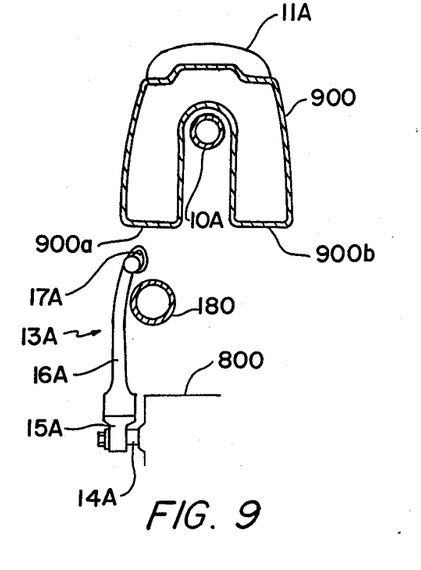
FIG. 9 is a sectional view taken along a line VI—VI of FIG. 8.

A fuel tank 900 is provided above the engine 800. The fuel tank 900 includes a U-shaped cross section as shown in FIG. 9. The fuel tank 900 is mounted on a main pipe 10A in the straddling condition. The main pipe extends rearwardly of the head pipe 200 and constitutes a part of the vehicle body frame 100. A seat 11A is provided rearwardly of the fuel tank 900. The forward end of the seat 11A covers the rear portion of the fuel tank 900. A pair of steps 120 project outwardly and are provided on the opposed sides of the lower portion of the vehicle body frame 100 in order to allow a driver to rest his/her legs thereon during driving in the seated condition on the seat 11A.

A kick pedal 13A is provided for allowing the driver to start the engine 800 by his/her foot. The kick pedal 13A comprises a pivot portion 15A being mounted on a kick shaft 14A of the engine 800. An arm portion 16A extends upwardly of the pivot portion 15A along the lateral side of the engine. A pedal portion 17A projects sidewise at the upper end of the arm portion 16A. The kick pedal 13A is normally arranged in the position as illustrated in FIG. 9 wherein the pedal portion 17A extends along the lateral side of the vehicle body. In operation, when the arm portion 16A is rotated 90 degrees in the horizontal direction, the pedal portion 17A projects laterally of the vehicle body. In this position, the pedal portion 17A is kicked by a foot to rotate the kick shaft 14A thereby to start the engine 800. An exhaust pipe 180 extends forwardly of a cylinder 8a of the engine 800, curves downwardly and laterally, and turns slightly upwardly so as to extend rearwardly while passing through the inside space of the arm portion 16A of the kick pedal 13A. An expansion chamber 18a of a larger diameter is formed at the middle portion of the exhaust pipe 180. A smaller diameter portion 18b follows the expansion chamber 18a. A silencer 19 is mounted adjacent a rear portion of the vehicle body.

According to this embodiment, as the exhaust pipe 180 is arranged to pass inside the arm portion 16A of the kick pedal 13A, the position of the exhaust pipe 180 is comparatively low, as illustrated in FIG. 9, relative to the positioning of the exhaust pipe in FIG. 5. The bottom portion 900a of the fuel tank 900 on the side where the exhaust pipe 180 is located may descend to the same level as the bottom portion 900b of the opposite side. Accordingly, the volume of the fuel tank 900 may be increased and the weight on the opposite lateral sides may be balanced. Further, the lower positioning of not only the bottom 900a of the fuel tank but also of the exhaust pipe 180 contributes to a lowering of the vehicular center of gravity. Also, the exhaust pipe 180 may be protected from the outside by the kick pedal 13A.

Figure 10A:
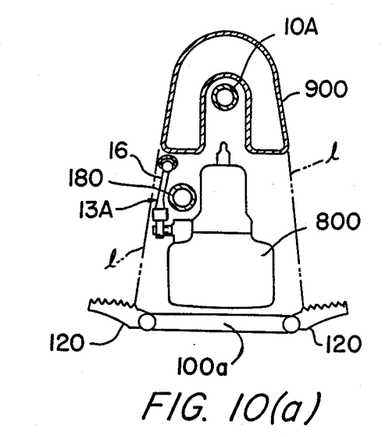
FIG. 10(a) is a sectional view similar to FIG. 9 and illustrating the kick pedal in a nonoperative arrangement.
Figure 10B:
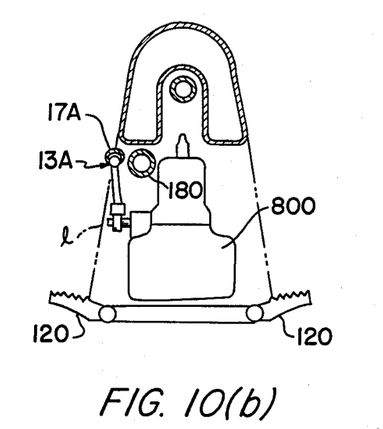
FIG. 10(b) is a sectional view similar to FIG. 10(a) with the exhaust pipe being disposed at a higher elevation.

The steps 120, as illustrated in FIGS. 10(a) and 10(b), laterally project from the opposite ends of a cross member 100a of the body frame. When viewing the structure along the cross section, the lines 1,1 which connect between the lateral side of the fuel tank 900 and the mounting portions of the steps 120 are spread, as illustrated, from upwards to downwards in the shape of an unfolded fan, so that the driver seated on the seat 11A may place his/her legs on the respective steps 120 naturally and comfortably with his/her knees and feet being positioned along the line 1,1. In this embodiment, the exhaust pipe 180, as illustrated in FIG. 10(a) is arranged inside of the arm portion 16A of the kick pedal 13A so that the kick pedal 13A does not protrude out of the line 1 even under the existence of the exhaust pipe 180 thereby ensuring a better riding condition of the driver as described above. Unlike the above, in case where the exhaust pipe 180 is positioned inside the pedal portion 17A of the kick pedal 13A, the upper portion of the kick pedal 13A will protrude outwardly of the line 1 thereby making it difficult to obtain a better riding position.

Figure 11:
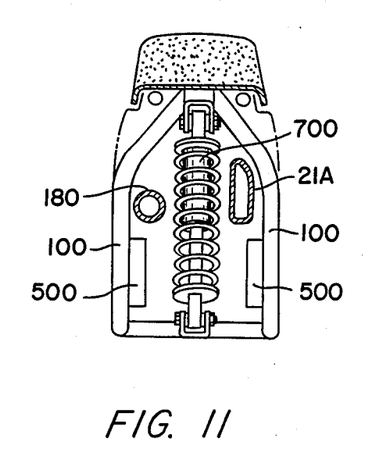
FIG. 11 is a sectional view taken along a line VIII—VIII of FIG. 8.

As illustrated in FIG. 11, the rear shock absorber 700 of a single type along the central plane of the vehicle body is connected at its upper end to the upper portion of the vehicle frame 100 and its lower end to a link mechanism 20A (see FIG. 8) which is provided between the rear fork 500 and the vehicle frame 100. The exhaust pipe 180 is arranged, on the left side of the rear shock absorber 700. An air/gas mixture intake system is arranged on the right side of the rear shock absorber 700 substantially at the same level as the exhaust pipe 180. The air/gas mixture intake system includes a carburetor and an air cleaner or the like. In FIG. 11, a connecting member 21A is positioned between the carburetor and the air cleaner of the intake system. In this way, the exhaust system and the intake system are arranged symmetrically with respect to the vehicular center axis thereby enabling the space to be effectively utilized. Also, the vehicle frame 100 is formed symmetrically so that the frame construction may be simplified.

As described heretofore, according to the present invention, in a motorcycle having the engine disposed under the fuel tank, and a kick pedal operating starter device provided at the side of the engine, the exhaust pipe of the engine is arranged passing inside the arm portion of the kick pedal operating starter device which connects the pedal portion with the pivot portion. Accordingly, the height of the bottom of the fuel tank above the engine is not restricted by the exhaust pipe. Thus, a fuel tank may be mounted which has a large volume and is well balanced in weight so as to contribute to lowering the center of gravity of the vehicle body. Further, the exhaust pipe is protected by the kick operating starter device and the starter device does not protrude out of the lateral side of the vehicle body.

According to a third embodiment of the present invention, in a motorcycle having a fuel tank above an engine, and a heat exchanger in front of the fuel tank, an exhaust pipe of the engine extends along a lateral side of a cylinder and rearwardly at a lower level relative to the heat exchanger and an air guide path is formed rearwardly of the heat exchanger between the exhaust pipe and the fuel tank.

Under this embodiment, cooling air passing through the heat exchanger, such as a radiator, is introduced into the air guide path so as to flow freely rearwardly, whereby a quantity of cooling air is expected to improve the cooling efficiency. Further, the cooling air passing through the air guide path may effectively exhaust the heat around the exhaust pipe.

Figure 12:
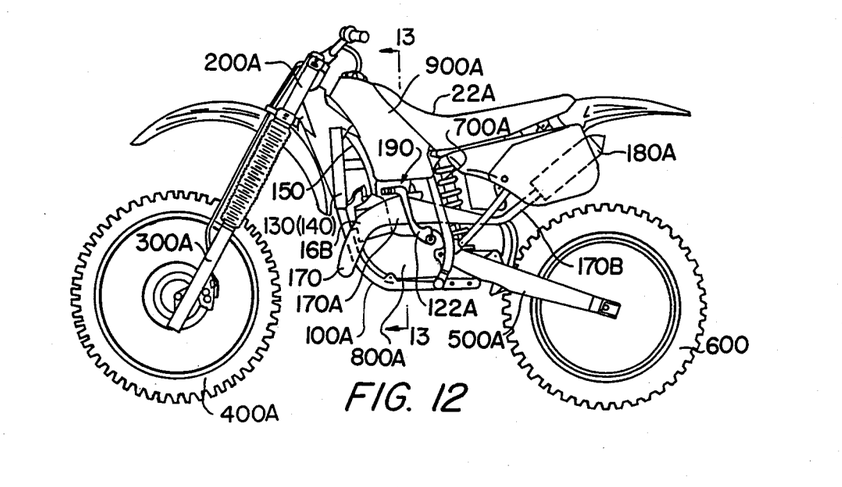
FIG. 12 is a side view showing the entire body of a motorcycle including an exhaust system according to a third embodiment of the present invention.

FIG. 12 is a side view which shows the entire off the road motorcycle according to a third embodiment of the present invention. Forwardly of a vehicle body frame 100A, a front wheel 400A is supported through the intermediary of a front fork 300A which is rotatably mounted relative to a head pipe 200A. A rear fork 500A is pivotally swingable about the rearward lower portion of the vehicle body frame 100A and extends rearwardly thereof. A rear wheel 600A is supported at the rear end of the rear fork 500A. A rear shock absorber 700 is arranged between the rear fork 500A and the upper construction of the vehicle body frame 100A.

In front of the shock absorber an engine 800A is mounted on the vehicle body frame 100A. The engine 800A is a water-cooled two stroke cycle engine. Above the engine 800A is arranged a fuel tank 900A which is formed with a U-shaped cross section. The fuel tank 900A straddles a main frame 10B which constitutes a part of the vehicle body frame 100A and extends rearwardly of the head pipe 200A. A seat 22A is mounted behind the fuel tank 900A and is provided with a front portion which covers the rear portion of the fuel tank 900A. A kick pedal 122A is arranged at a lateral side of the engine 800A for allowing a driver to start the engine by means of his/her foot.

Figure 13:
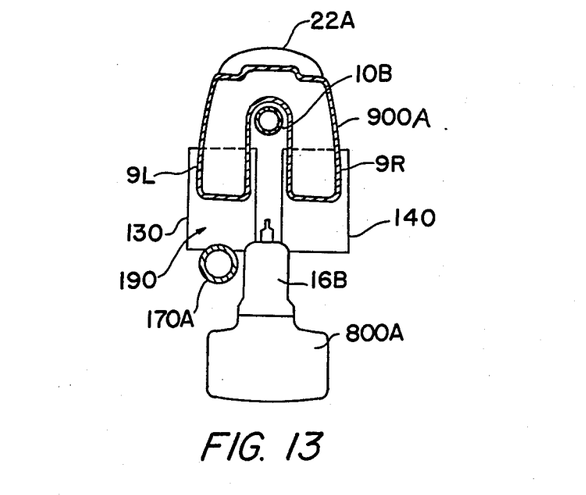
FIG. 13 is a partial sectional view of the essential parts taken along line 13—13 of FIG. 12.

The fuel tank 900A straddling the main frame 10B has a pair of left and right depending portions 9L, 9R. A pair of radiators 130, 140 are arranged on the vehicle body frame 100 in front of the left and right depending portions, respectively. As coolant for the engine 800A is contained within radiators 130, 140 which circulates through a hose 150 so as to be cooled by radiating and exchanging heat with air flowing past the radiators 130, 140 from a forward to a rearward direction. An exhaust pipe 170 extends forwardly of a cylinder 16B of the engine 800A, turns downwardly and laterally, and then slightly upwardly, passes along the left side face of the cylinder 16B and inside the kick pedal 122A, and extends straight rearwardly. The middle portion of the exhaust pipe 170 forms an expansion chamber 170A of a larger diameter which is in communication with a smaller diameter portion 170B formed to be connected to a muffler or silencer 180A in the rear portion of the vehicle body. As explained above, the exhaust pipe 170 is arranged along the cylinder 16B at a level lower than the radiators 130, 140 so that an air guide path 190 extending in the longitudinal direction of the vehicle, is formed between the bottom face of the left depending portion 9L of the fuel tank 900A and the top face of the expansion chamber 170A of the exhaust pipe 170. The radiator 130 is positioned in front of the air guide path 190.

In the third embodiment of the present invention, the cooling air passing the radiator 130 from forwardly to rearwardly thereof is guided by the air guide path 190 and may be freely, smoothly directed rearwardly. Therefore, a sufficient amount of cooling air will flow into the radiator 130 from a forward direction thereof, thereby effectively cooling the engine coolant which circulates in the radiator 130. Further, the cooling air flowing through the air guide path 190 cools the circumference of the expansion chamber 170A and the cylinder 16B to prevent the air heated by the engine 800A from staying therearound.

In the third embodiment, the exhaust pipe 170 is arranged at the left side of the cylinder 16B and the air guide path 190 is formed at the rear side of the left side radiator 130. However, it is possible to position the exhaust pipe 170 at the right side of the cylinder 16B and to form the air guide path 190 at the rear side of the right side radiator 140. Also, it is possible to have arranged a pair of exhaust pipes 170 at both right and left sides of the cylinder 16B and to form the air guide path 190 at the rear sides of the respective radiators 130, 140.

According to the third embodiment of the present invention, as explained heretofore, in the motorcycle which includes a fuel tank above the engine and the heat exchanger forwardly of the fuel tank, the exhaust pipe of the engine extends rearwardly along the lateral side of the cylinder at a level lower than the radiator, and the air guide path is formed behind the heat exchanger by the exhaust pipe and the fuel tank. Therefore, the cooling air which passes through the heat exchanger flows rearwardly without resistance through the air guide path so that the volume of the cooling air passing through the heat exchanger may be increased thereby improving the cooling efficiency. Further the hot air above the engine may be effectively exhausted outside.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A motorcycle exhaust pipe arrangement comprising:
    a frame including a head pipe, a main pipe, a down tube, at least one under pipe and a pair of center pipes;
    a space being defined between said pair of center pipes;
    a fuel tank operatively connected to said main pipe;
    an engine mounted on said at least one under pipe and being disposed beneath said fuel tank;
    a seat mounted adjacent said fuel tank and being disposed above said engine;
    a rear shock absorber operatively mounted between said main pipe and a rear fork for absorbing shock supplied to said main pipe, said rear shock absorber being centrally disposed relative to a longitudinal axis of said motorcycle;
    an exhaust pipe connected to said engine and extending rearwardly therefrom, said exhaust pipe being disposed substantially at a side of said rear shock absorber and extending substantially horizontally therefrom in said longitudinal direction of said motorcycle for lowering the center of gravity of said motorcycle and providing a symmetrical rigid frame for supporting said engine, fuel tank and seat; and
    a kick operating starter device having a pivot portion and an arm portion, said pivot portion being operatively connected to said engine, said exhaust pipe being disposed within an area adjacent to said arm portion for enabling said kick operating starter device to be positioned directly adjacent to said engine in an inoperative position.

2. A motorcycle according to claim 1, wherein said exhaust pipe extends within the space defined between said pair of center pipes.

3. A motorcycle according to claim 1, and further including an air intake pipe being disposed on an opposite side of said engine relative to said exhaust pipe.

4. A motorcycle according to claim 3, wherein said exhaust pipe is disposed at a lower elevation relative to said air intake pipe and said air intake pipe extends within the space defined between said pair of center pipes on an opposite side of said rear shock absorber relative to said exhaust pipe.

5. A motorcycle exhaust pipe arrangement comprising:
    a frame including a head pipe, a main pipe, a down tube, at least one under pipe and a pair of center pipes;
    a space being defined between said pair of center pipes;
    a fuel tank operatively connected to said main pipe;
    an engine mounted on said at least one under pipe and being disposed beneath said fuel tank;
    a seat mounted adjacent said fuel tank and being disposed above said engine;
    a rear shock absorber operatively mounted between said main pipe and a ear fork for absorbing shock supplied to said main pipe, said rear shock absorber being centrally disposed relative to a longitudinal axis of said motorcycle;
    an exhaust pipe connected to said engine and extending rearwardly therefrom, said exhaust pipe being disposed substantially at a side of said rear shock absorber and extending substantially horizontally therefrom in said longitudinal direction of said motorcycle for lowering the center of gravity of said motorcycle and providing a symmetrical rigid frame for supporting said engine, fuel tank and seat; and
    a heat exchanger operatively positioned in a forward direction relative to said fuel tank and said exhaust pipe extending rearwardly along a lateral side of said engine at a lower elevation relative to said heat exchanger for forming an air flow passage in a rearward direction with respect to said heat exchanger defined between said fuel tank and said exhaust pipe.

6. A motorcycle according to claim 5, wherein said exhaust pipe extends within the space defined between said pair of center pipes.

7. A motorcycle according to claim 5, and further including an air intake pipe being disposed on an opposite side of said engine relative to said exhaust pipe.

8. A motorcycle according to claim 7, wherein said exhaust pipe is disposed at a lower elevation relative to said air intake pipe and said air intake pipe extends within the space defined between said pair of center pipes on an opposite side of said rear cushion relative to said exhaust pipe.

* * * * *